INVENTOR.
ROBERT R. HAGER
BY
Richard F. Geib
ATTORNEY

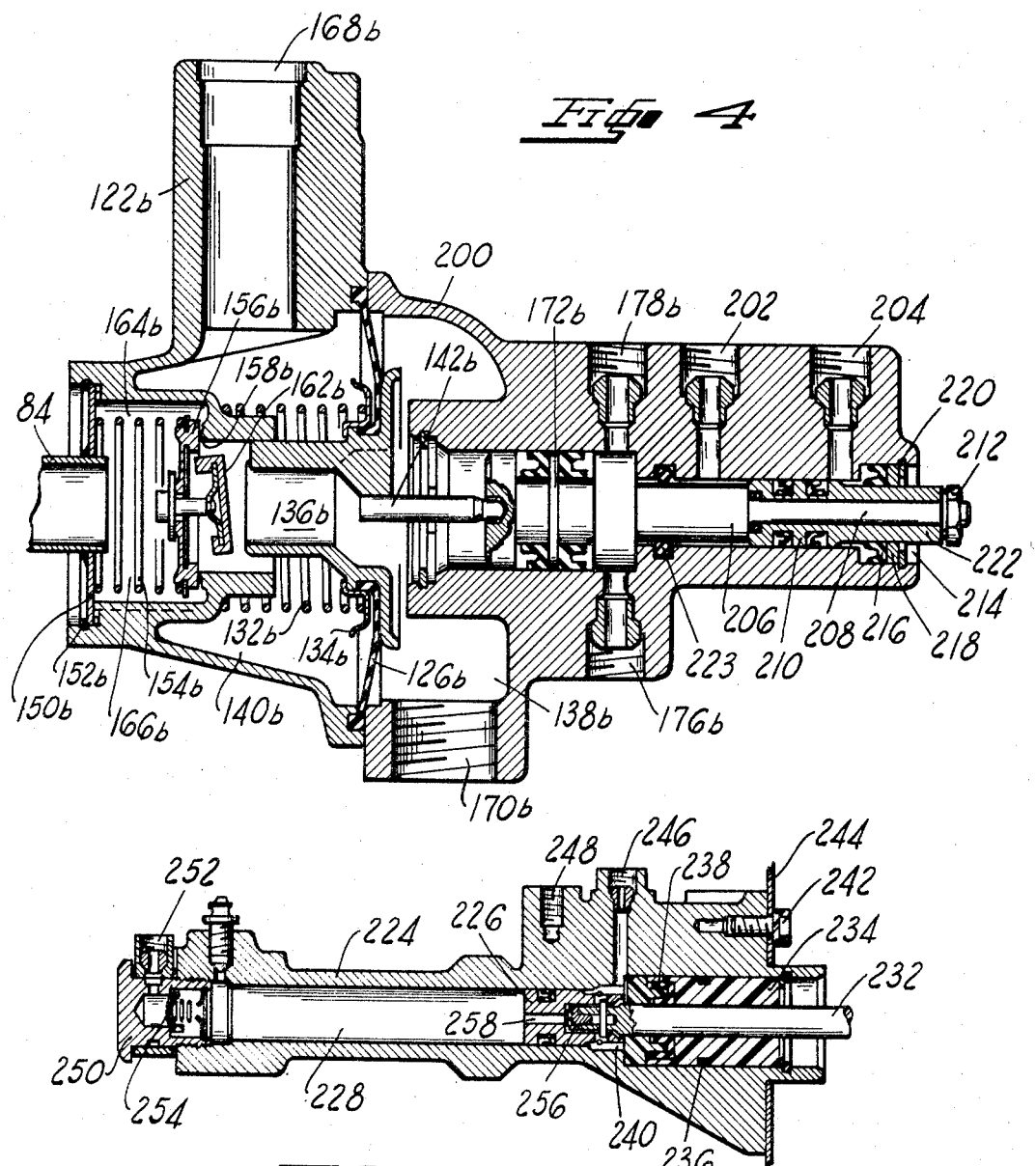

United States Patent Office 3,434,285
Patented Mar. 25, 1969

3,434,285
DUO SERVOMOTOR VALVE MEANS
Robert R. Hager, South Bend, Ind., assignor to The Bendix Corporation, a corporation of Delaware
Filed May 22, 1967, Ser. No. 640,064
Int. Cl. F02b *73/00;* F15b *11/22;* G05d *11/02*
U.S. Cl. 60—54.5                                          14 Claims

ABSTRACT OF THE DISCLOSURE

A valve device for controlling simultaneously the operation of two differential pressure servo-devices incorporating valve means associated with a pressure responsive motor and having a reaction means comparing working pressures developed by said servo devices for balancing the working pressures by monitoring the valve operation.

SUMMARY

Upon the legislation of safety requirements for vehicles, manufacturers have been mandated to provide split type braking systems, i.e., a braking system having an actuator for developing separate fluid pressures to one set of brakes, such as the front brakes and another entirely separate braking pressure for another set of brakes, such as the rear brakes of the associated vehicle.

This has been a rather easy requirement to meet for low gross weight vehicles employing servo-devices that are manually operated by the brake pedal to pressurize a split type of master cylinder. However, for the higher gross weight vehicles, such as commercial trucks, busses, etc., where the displacement requirements and brake line pressure are of a much greater magnitude, some problems have arisen in designing to the legislated safety requirements.

In such commercial systems it has been the practice to utilize differential air pressure or vacuum type servomotors operating slave cylinders, which servomotors have been actuated by a fluid pressure from a master cylinder. In such systems the servo-devices can be located almost anywhere on the vehicle chassis and a conduit from the master cylinder will feed the operating pressure to the valve controlling means for the servo-devices.

Many attempts have been made in the prior art to change this familiar system to employ two of the servo-devices which are separately operated by a split type master cylinder. In these attempts it has been found that because of variances in manufacturing tolerances of not only the split type master cylinder but each of the servo-devices it is predictable that each of the separate servo-devices will be developing different pressures for the portions of the braking system of the vehicle with which they are separately associated. It has been found, for example, that a 50 p.s.i. differential between the pressures developed by the split type master cylinder, which can be expected from such master cylinders as are on the market today, that this pressure differential is multiplied by a factor of 10 so that the working pressures developed in the slave cylinders of the servo-devices may differ by as much as 500 p.s.i.

There have been some attempts in the prior art to provide a duo valve control means for actuating the separate servo-devices which will compare input pressures to both of the valve means from the split type master cylinder and attempt to equalize the same as it tends to operate the valve means so that the servo-devices will be provided with equal pressure-differentials across movable walls therein which control pistons within the slave cylinders. In these systems, it is still possible to derive a different working pressure or brake line pressure, as it may be termed, from the separate slave cylinders again because of differences in manufacuring tolerances between the separate servo-devices.

It is, therefore, an object of this invention to provide a valve means which references not the input or controlling pressure for an operator-operated control means but to provide a reference of working pressures so that the end result and not an intermediate action is utilized to provide the desirable equal brake line pressures developed by servo-devices.

As may be readily expected by those skilled in the art to which this invention relates, servo-devices of the type utilized in this invention have other applicability than within the braking systems of the vehicles. For example, they may be employed in regulating industrial presses, positioning airplane control surfaces, etc.

DRAWING DESCRIPTION

FIGURE 4 is a cross sectional illustration of one of the valve means identical to the other valve means as utilized with the separate servomotors of FIGURE 2; and FIGURE 5 is a cross sectional illustration of a slave cylinder and employed in the servomotor assemblies of FIGURES 1 and 2.

DETAILED DESCRIPTION

Figure 1:
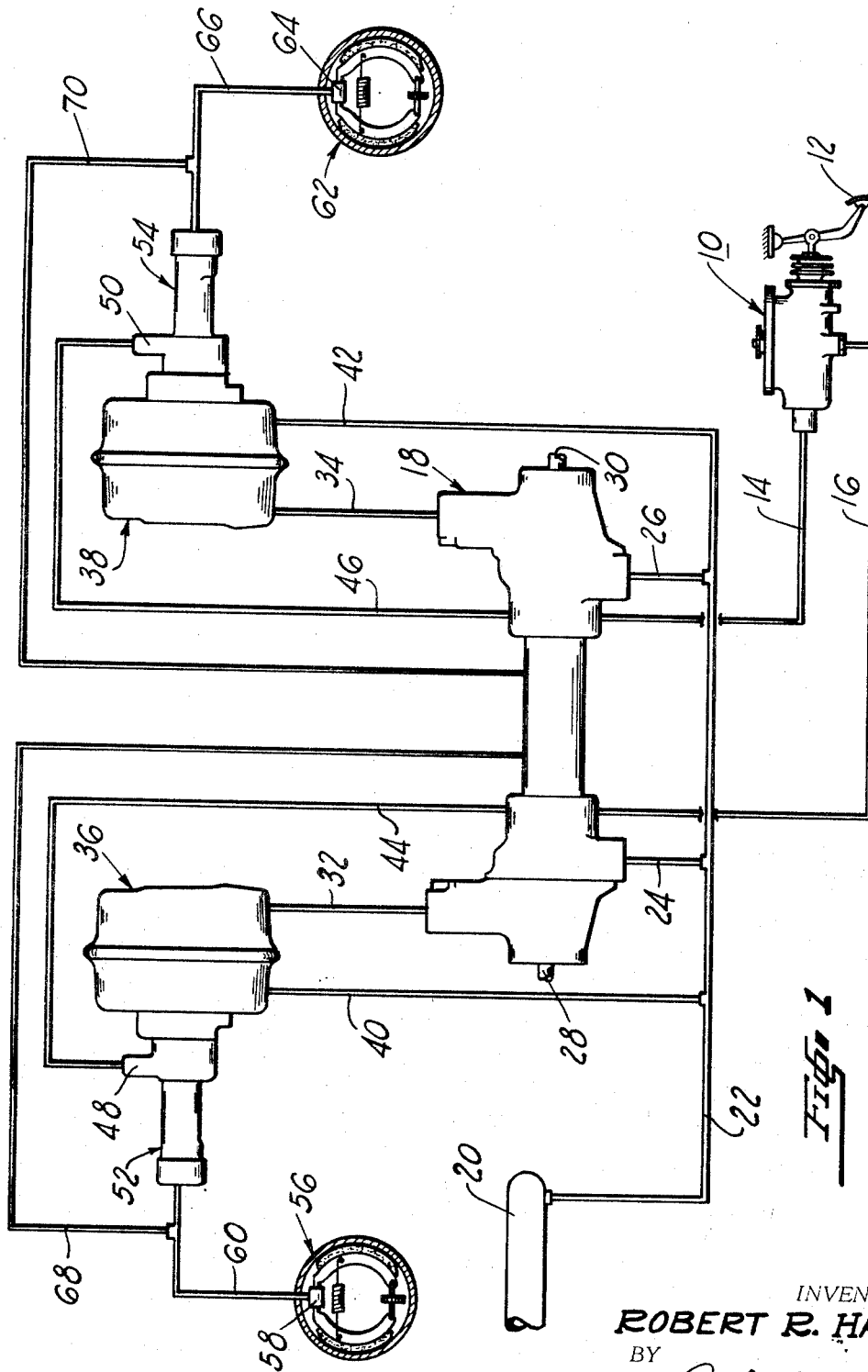
FIGURE 1 is a schematic illustration of a braking system employing separate pneumatic pressure servomotors controlled by a pair of valves that are actuated by a split system type master cylinder.

With reference now to FIGURE 1 there is shown a master cylinder 10 operable by a brake pedal 12 to create separate fluid pressures for conduits 14 and 16 communicating the master cylinder 10 to a valve means 18. The valve means 18 is connected to an engine intake manifold 20 by means of a conduit 22 having branches 24 and 26, and atmospheric pressure is introduced to the valve means by way of inlets 28 and 30.

Figure 3:
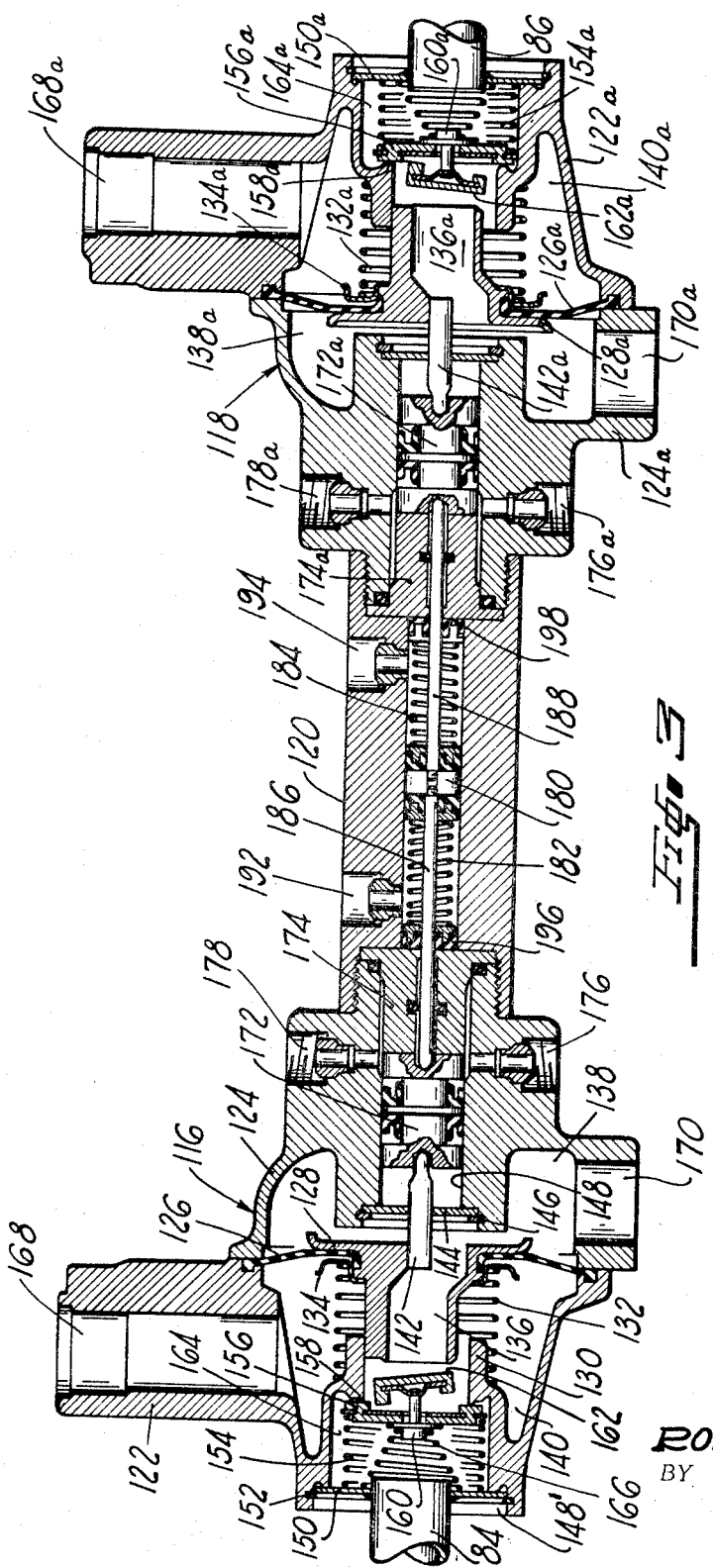
FIGURE 3 is a cross sectional illustration of a valve means as seen in FIGURE 1 for controlling the separate servomotors.

Internally of these valve means, as will appear with reference to the description of the structure of FIGURE 3, valve elements are provided to control the communication of the vacuum from the engine intake manifold 20 or the atmosphere from the ports 28 and 30 to control pressure conduits 32 and 34 which lead to control chambers within respective servomotor devices 36 and 38. These servo-devices also have vacuum chambers on the other side of the movable wall therein which are connected by branch conduits 40 and 42 to the conduit 22 leading from the engine intake manifold 20.

Internally of the valve means 18 the hydraulic pressure from the master cylinder 10, as delivered by the conduits 14 and 16, is communicated to outlet ports to which a pair of conduits 44 and 46 are connected leading to inlets 48 and 50 of slave cylinders 52 and 54, respectively, operated by the servomotor 36 and 38.

To complete the schematic system a wheel brake 56 having a wheel cylinder 58 is communicated by a conduit 60 to the slave cylinder 52; whereas a wheel brake 62 having a wheel cylinder 64 is communicated by a conduit 66 to the slave cylinder 54, and a branch conduit 68 leads from the conduit 60 back to the valve device 18 with a similar branch conduit 70 leading from the conduit 66 back to the valve device 18.

Figure 2:
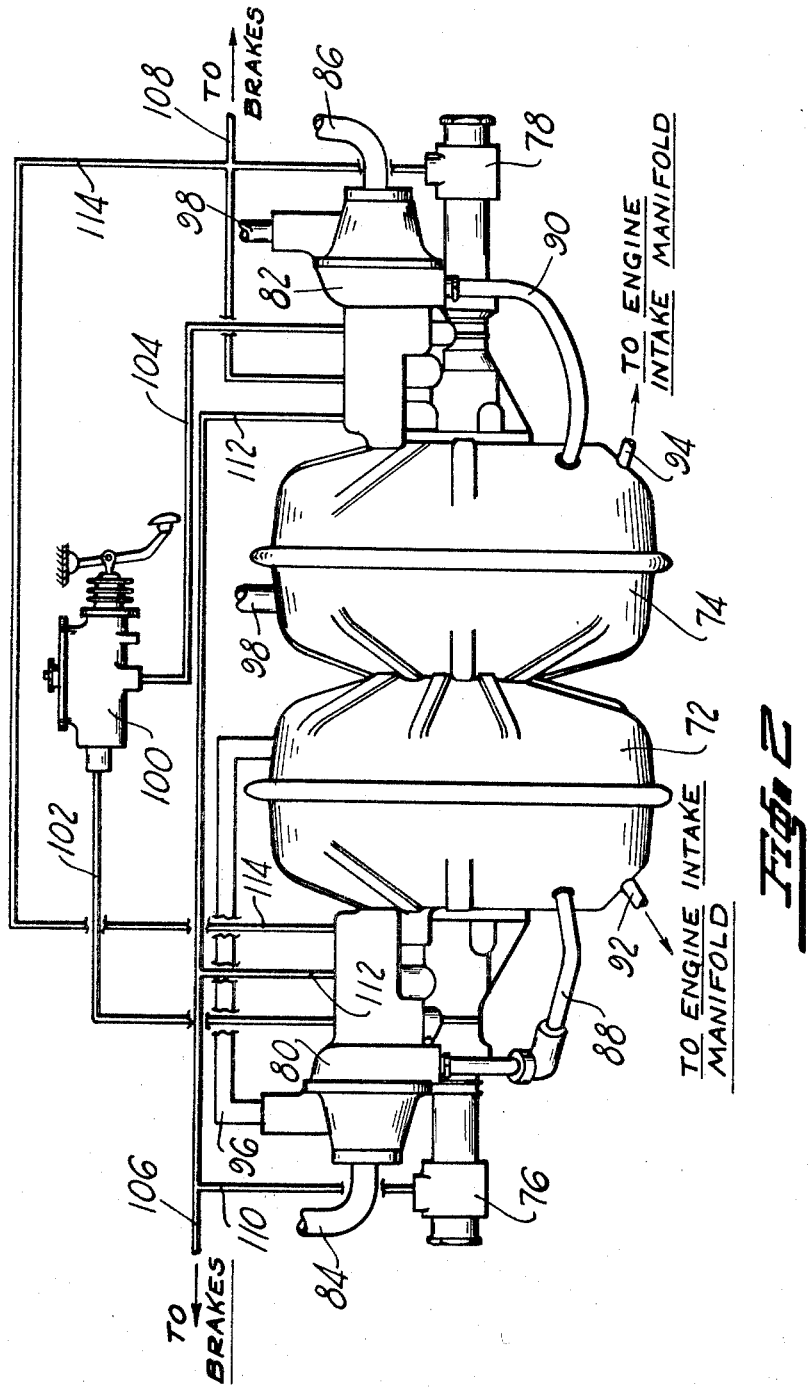
FIGURE 2 is another schematic illustration of another servomotor operated braking system having the servomotors attached for simplified mounting with separate valve means operatively related by appropriate conduits to provide equalized development of working pressures to the brakes of the associated vehicle.

With reference now to another form that the braking system may take, attention is directed to FIGURE 2 showing a pair of servomotor devices and valve means integrated into one unit assembly. More particularly, separate power chambers 72 and 74 are welded or otherwise joined together with their slave cylinders 76 and 78 extending in opposite directions on the axis thereof and valve means 80 and 82, which could be cast with the slave cylinders 76 and 78, are mounted on the respective slave cylinders. The valve means receive atmospheric air via conduits 84 and 86, and vacuum via tubes 88 and 90 that are communicated to the vacuum chambers of the power cylinders 72 and 74 which are connected by conduits 92 and 94, as the legend indicates, to the engine intake manifold. A control pressure conduit 96 communicates the control port of the valve means 80 to the control chamber of the power cylinder 72, and, similarly, a control pressure conduit 98, broken for drawing clarity, communicates the control pressure port of the valve 82 to the control chamber of the power cylinder 74. It may be thus realized that instead of having to mount three pieces of structure within the vehicle as one would have to do with reference to the system schematically illustrated by FIGURE 1, the servomotor device and valve means may be mounted as a unit to the frame rails of the truck, bus or similar type vehicle. After it has been installed, it merely remains to connect a master cylinder 100 to the valve means by installing conduits 102 and 104 and the connection of conduits 106 and 108 to the vehicle brake apparatus, as seen in FIGURE 1. Conduits 110, 112 and 114 as well as conduits 106 and 108 can be furnished with the supply of this unit type servomotor, as will be appreciated by those skilled in the art to which this invention relates.

With reference now to the particulars of construction of the valve device 18, attention is directed to FIGURE 3 showing that it is essentially comprised of valve housings 116 and 118 connected by a cylinder 120. The valve housings include two cast structures 122 and 124 joined together with the bead of a reaction diaphragm 126 interposed to seal the juncture. Prior to the assembly of the portions 122 and 124 valve elements comprising a valve plunger 128 that is connected to the reaction diaphragm 126 is slidably related to a control passage formed by an annular internally projecting boss 130 of the valve housing portion 122 and biased away therefrom by means of a valve return spring 132 assembled between the boss 130 and a spring bearing plate 134 which is biased by the spring 132 to project over the inner bead of the diaphragm 126 to maintain its assembly with the valve plunger 128. A valve plunger is provided with an internal passage 136 to communicate a vacuum chamber 138 to a control chamber 140 of the valve housing through the valve plunger, and a push rod 142 is press fitted to the plunger 128. A support plate 144 held by a snap ring 146 at the end of a bore 148 of the valve housing portion 124 supports the rod 142 loosely. The valve housing portion 122 is provided with an opening 148' closed by a plate 150 welded to the atmospheric inlet conduit 84 and held within the opening by a snap ring 152. This plate also serves as a bearing means for a valve spring 154 maintaining a poppet valve 156 on a valve seat 158 formed on the housing portion 122. The poppet 156 comprises an annular member and an axial poppet member 160 having an actuating surface 162 engageable by the valve plunger 128 so as to permit progressive closing of the passage 136 and opening of atmospheric chamber 164 to the control chamber 140 upon translation of the plunger 128 to compress the conical valve spring 166. Housing portion 122 is also provided with a control pressure port 168 to which the conduits 32, see FIGURE 1, is attached for providing control pressure to the servo-device 36; whereas housing portion 124 is provided with a vacuum inlet port 170 that is connected by the branch conduit 24 to the conduit 22 leading from the engine intake manifold 20, as seen in FIGURE 1 also. Thus, in the nonapplied condition shown for the valving elements, vacuum entering port 170 will flow through the passage 136 of the plunger 128 to the control pressure port 168 whereby the movable wall of the servo-device 36 is suspended in vacuum.

Valve housing portion 124 is axially bored, as at 148 for the receipt of a pressure responsive motor or actuating piston 172 which is abuttingly connected to the push rod 142 and normally biased by the valve return spring 132 against a plug 174 to close the bore 148. In order to actuate the piston 172, a hydraulic pressure inlet 176 is provided for the connection therewith of the conduits 16 leading from the master cylinder 10, as seen in FIGURE 1. Also, a hydraulic pressure outlet port 178 is provided in the housing portion 124 in registry with the fluid entering via the hydraulic inlet port 176 so that the fluid from the master cylinder will be utilized upon passing through the slave cylinder to pressurize the wheel cylinder 58 to a limited degree prior to the application of pressure differential within the servomotor 36.

Similar numbers bearing the subscript a show that the valve housing 118 is exactly like the valve housing 116. Therefore, it is not believed that more detailed description of its construction is necessary.

The cylinder 120 is threaded at each end and thereby joined to the valve housing portions 124 and 124a. It is internally bored prior to the assembly to one or the other of the housing portions 124 or 124a and after the assembly to one or the other of these same housing portions a piston 180 is inserted into the bore of the cylinder 120 to be centered between springs 182 and 184. The piston may be integrally formed with or have attached thereto force transmitting rods 186 and 188 which abuttingly connect with the respective pistons 172 and 172a of the valve means 116 and 118. The piston 180 may be termed a reaction piston in that working pressures from the servomotors 36 and 38 are communicated to inlet ports 194 and 192 to be active on opposite faces of the piston 180, and in order to maintain the integrity of the reaction chambers on either side of the piston 180, seal means 196 and 198 are fitted around the respective rods 186 and 188 and held by the springs 182 and 184 against the plugs 174 and 174a. As seen, the plugs 174 and 174a are axially drilled to permit the passage of the rods 186 and 188 therethrough for the abutting connection aforementioned.

With regard to the valve means utilized with the unit assembly of FIGURE 2, attention is now directed to the structure shown in FIGURE 4, and as each of the valve means 80 and 82 are alike, it is believed that description of the construction of one of them will suffice. It should also be noted that there are similar elements within the valves 80 and 82, as within the valve means 18, and they will be enumerated wtih the subscript b to the same numerical reference of the element of FIGURE 3.

Essentially, the main difference between the valve means 80 and 82 and that of the valve means 18 is the elimination of the cylinder 120 and the substitution of a different housing portion 200 which is joined to the housing portion 122b as with respect to the joining of the housing portions 122 and 124 described above. The new housing portion 200 is not only provided with the hydraulic inlet port 176b for connection with the master cylinder and the hydraulic outlet port 178b for connection with the slave cylinder of the servomotor devices, but also is provided with working pressure ports 202 and 204. Also it should be noted that the valve actuating piston 172b is provided with a rearwardly porjecting rod 206 having a stepped down portion 208 about which a reaction piston 210 is fitted and held thereto by means of a nut 212 threaded to the stepped down rod 208 of the piston 172b within a stepped bore 214 of the housing portion 200. A seal 216 backed up by a ring 218 is held by a snap ring 220 about the reaction piston shank 222 to close the bore 214 at its extreme right end, as seen in FIGURE 4. The larger portion of the stepped projection 206 is grooved for the receipt of an O-ring 223 to prevent communication of the master cylinder pressure entering via the inlet port 176b from communicating to the working pressure port 202, and vice versa. As can be clearly seen from the drawing, the effective area of the piston 172b is substantially larger than the effective area of the reaction piston 210 that is affixed thereto.

While it is readily apparent to those skilled in the art of the internal constructional details of the servomotor power cylinders, namely that there is a movable wall either of diaphragm or piston type biased by a spring and connected to a push rod, it is believed that a description of the slave cylinder details which may or may not be as readily familiar to those people would be advantageous at this point. Therefore attention is directed to FIGURE 5 showing a slave cylinder housing 224 within which a piston 226 is operable to create hydraulic pressure in a pressure developing chamber 228 ahead of the piston 226. The piston is connected by means of a pin to the push rod 232 operatively connected to the movable wall (not shown) of the power cylinder so that the return spring (not shown) for the power cylinder will maintain the piston 226 in its rearward position, as seen, until a pressure differential has developed across a movable wall. The slave cylinder housing 224 is also provided with a plastic bearing 234 to support the push rod 232 and in turn, the movable wall in the power cylinder, which plastic bearing support 234 is provided with seals 236 and 238 to prevent the pressure within the chamber 228 or the follow-up chamber 240 from passing rearwardly into the power cylinder. Bolts 242 join the housing 224 to the power cylinder housing 244.

A hydraulic pressure inlet port 246 is provided in the housing 224 to which may be connected either the conduits 44 and 46 or the conduits 102 or 104. It should be noted in this regard that with the unit construction of FIGURE 2 that the inlet port 246 may be, in the event that the housing portion 200 is cast with the slave cylinder housing 224 between the two housings. In the event that the valve housing portions and the slave cylinder housing are to be separate structures, tapped mounting provisions 248 may be provided for attaching the valve structure to the slave cylinder housing 224. A plug 250 closes the chamber 228 and is provided with outlet port provisions 252 as well as residual pressure check valve means 254 therebehind.

OPERATION

In operation the operator upon depressing the brake pedal 12 for the master cylinder 10 will send a hydraulic pressure via conduits 14 and 16 to the inlets 176 and 176a to be effective on the pistons 172 and 172a. This hydraulic pressure also exits via the ports 178 and 178a to the inlet port 246 of the slave cylinder housing 224 to flow into the follow-up chamber 240. As the pressure enters the follow-up chamber 240, it flows around the rod 232 and about a valve 256 carried on the end of the rod 232 into an axial passage 258 of the piston 226 in that the movable wall in the power cylinder has not caused the rod 232 to abut the valve 256 on the piston 226 to close the passage 258. This initial pressure will flow from the pressure developing chamber 228 via the residual pressure check valve 254 and the discharge outlet 252 to the wheel cylinders 58 and 64 for the brakes 56 and 62, respectively, to take up the slack in the brake assemblies. After the slack has been taken up in the brake assemblies 56 and 62, the pressure will now be effective upon the pistons 172 and 172a to translate the valve plungers 128 and 128a to bring the structure of the valve plungers about the openings 136 and 136a thereto into contact with the angularly disposed poppet control plate 162. As hydraulic pressure from the master cylinders increases, the angularly disposed poppet control plate 162 and 162a will eventually entirely close off the communication of the chambers 138 and 140 or 138a and 140a of the respective valve housings 116 and 118. At the same time, the angularly disposed poppet control plates 162 and 162a will first open a limited area orifice axially of the poppets 156 and 156a to begin communication of atmospheric pressure from the conduits 84 and 86 and within the atmospheric chambers 164 and 164a to the control chambers 140 and 140a where it exits via the ports 168 and 168a to the control chambers of the servomotor devices 36 and 38. Eventually, the master cylinder pressure upon reaching a predetermined value will completely remove the poppets 156 and 156a from the seats 158 and 158a, at which time vacuum communication through the passages 136 and 136a is completely terminated and atmospheric pressure fills the control chambers 140 and 140a. As this is occurring, the pressure differential across the movable walls in the servomotor devices 36 and 38 has translated the push rod 232 to close the passage 258 and begin moving the piston 226 to reduce the volume of the pressure developing chamber 228 of the slave cylinder housing 224. Thus, one might say, that the brake assemblies 56 and 62 are now being actuated to decelerate the associated vehicle. At the same time, the working pressures at the discharge outlets 252 of the slave cylinders 52 and 54 are being communicated by means of conduits 68 and 70 to the working pressure ports 192 and 194. So long as these working pressures are equal, the piston 180 will maintain its position where it is centered by the springs 182 and 184 and the pistons 172 and 172a are movable relatively to the rods 186 and 188. If, on the other hand, the working pressure from the slave cylinder 52 is greater than that from the slave cylinder 54, the piston 180 will be translated to again abut the valve actuating piston 172a and create further opening of the poppet 156a to create more pressure differential in a servomotor device 38 whereby the working pressure of the slave cylinder 54 may be equated to that of the slave cylinder 52.

The same steps in operation are readily apparent from an understanding of the similar structure of the valves 80 and 82 as with respect to the valve means 18. However, it should be noted that as the annular action piston 210 is affixed to the valve actuating piston there is a tendency to oppose the inlet pressure at ports 176b with the working pressure from the servomotor slave cylinder 76 or 78. This is especially an important consideration in view of the fact that the inlet pressure for the port 176b is going to be always of a lesser magnitude than that provided as an output pressure of the slave cylinders. However, as the area of reaction piston 210 is proportioned to the effective area of the valve actuating piston 172b, and as the working pressure of the other slave cylinder is communicated to the opposite side of the reaction piston 210 via port 204, the valve actuating piston 172b will not be translated in any direction other than that demanded by the master cylinder pressure unless the working pressures at the ports 202 and 204 are of unequal magnitude.

Having fully described an operative construction of structure embodying the principles of my invention, it is now intended to set forth a scope of protection sought for the invention by the appended claims.

I claim:

1. A differential pressure operable servomotor means comprising:
 at least two separate slave cylinders delivering separate working pressures;
 at least two valve means for controlling said servomotor means in the development of fluid pressure by said separate slave cylinders, each of said valve means including piston means operatively connected to valve poppet means;

a floating piston operatively arranged between each of said piston means; and means to communicate one portion of said separate working pressures from one of said separate slave cylinders on one side of said floating piston and another portion on the other side whereby said piston means is positioned by comparing said working pressure to cause said valve means to monitor the pressure differential of the servomotors by increasing and decreasing the opening of said valve poppets, as required, to monitor the pressure differential of the servomotor means whereby equal working pressures are effected in said separate slave cylinders.

2. A method of operating two pneumatic servomotors by separate first and second hydraulic pressures comprising the steps of:

delivering said first hydraulic pressure to a motor operated valve to create an actuatable pressure differential in one of the two servomotors;

delivering said second hydraulic pressure to another motor operated valve to create an actuatable pressure differential in the other of the two servomotors;

sensing the working force produced by each of said servomotors;

comparing the working force of each of said servomotors in each of the motor operated valve for said one servomotor and said other servomotor; and regulating said motor operated valve for said one servomotor and said other servomotor in accordance with the comparison of the working force to equalize the working force produced by each of said servomotors.

3. A tandem valve means comprising:

a pair of valve actuating pistons;

a floating piston means between and and operably connected to each of said valve actuating pistons and creating variable volume chambers on each side of said floating pistons between it and the respective valve actuating pistons; and means to communicate one variable volume chamber on one side of said floating piston means to a fluid pressure generated by operation of said valve means, and another fluid pressure controlled by said valve means to the variable volume chamber on the other side of said floating piston means whereby said floating piston means will regulate said valve actuating pistons in accordance with the generated fluid pressures.

4. A valve means according to claim 3 and further comprising a diaphragm supported valve actuating element and cooperating valve poppet for each of said valve actuating pistons.

5. A valve means according to claim 4 wherein said floating piston means is linked to said valve actuating pistons and movable relative thereto.

6. A servomotor assembly comprising:

two differential pressure servomotors inclusive of slave cylinders for developing separate hydraulic working pressures;

a valve means for operating said two differential pressure servomotors, said valve means including:

a valve body with a bore therein, a valve actuating piston in said bore, a valve operating member operatively connected to said valve actuating piston, a floating piston in said bore operatively connected to said valve actuating piston, and means for admitting said separate working pressures from said separate slave cylinders to opposite sides of said floating piston to monitor the actuation of said valve actuating piston whereby the working pressures are equalized by said floating piston controlling said overriding valve actuating piston whenever a pressure differential exists across said floating piston.

7. A valve means for operating two differential pressure servomotors controlling separate slave cylinder pressure development, said valve means comprising:

a valve housing with a bore therein;

valve actuating piston means in said bore;

valve devices at each end of said bore operatively connected to separate portions of said piston means;

a floating piston in said bore between said portions of said piston means and operatively connected to said portions;

first and second actuating pressure inlets into said valve housing adjacent, respectively, said separate portions of said valve actuating piston means; and means to introduce third and fourth fluid pressures adjacent opposite sides of said floating piston such that whenever a fluid pressure differential exists accross said floating piston it will move to adjust said valve devices to equalize the third and fourth pressures.

8. A differential pressure servomotor assembly comprising:

a pair of separate slave cylinders for the servomotor assembly to develop separate working pressures;

a remote valve means for said servomotor assembly including:

a valve housing with a bore therein, a pair of valve actuating pistons in said bore at each end thereof, valve devices at each end of said bore operatively connected, respectively, to separate portions of said piston means at each end, and a floating piston in said bore between said portions of said piston means and operatively connected to said portions;

operator-operated means for developing fluid pressure which is connected to said valve housing at inlet ports thereof adjacent respective portions of said valve actuating piston means; and means to communicate said separate slave cylinders to opposite sides of said floating piston to compare discharge pressures of the separate slave cylinders with said floating piston to adjust said valve devices to equalize their control pressure outputs for both servomotors.

9. A valve means according to claim 7 and comprising means to center said floating piston in said box.

10. A valve means according to claim 8 and comprising means to center said floating piston in said bore.

11. A valve means according to claim 9 and further comprising means responsive to a differential pressure created by the control pressure on one side of said means and a reference pressure on the other side of said means when said valve actuating piston opens a valve poppet of said valve device to provide proportioned reaction on said valve actuating piston.

12. A valve means according to claim 10 and further comprising means responsive to a differential pressure created by the control pressure on one side of said means and a reference pressure on the other side of said means when said valve actuating piston opens a valve poppet of said valve device to provide proportioned reaction on said valve actuating piston.

13. A valve comprising:

a housing having a chamber to which fluid operating pressures are communicated, said housing also having a cylindrical portion;

a valve plunger supported in said chamber, said plunger having passage means communicating therethrough a fluid pressure;

a valve poppet operatively arranged in a fluid pressure inlet to said chamber to be operable upon engagement therewith of said plunger to close said passage and open said inlet sequentially;

pressure responsive motor means operatively connected to said valve plunger; and means operatively connected to said motor means to balance of work output of said valve means regardless of operator-operated means controlling said motor.

14. A valve comprising:

pressure controlling valve elements;

operator-operated piston means operatively connected to said valve elements having a large effective area;

floating piston means operatively connected to said operator-operated piston means; and means to provide working pressures on each side of said floating piston means to thereby regulate said valve elements to provide control pressure from said valve elements which will provide equal working pressures.

References Cited

UNITED STATES PATENTS

| | | | |
|---|---|---|---|
| 2,009,102 | 7/1935 | Bern | 137—98 XR |
| 2,381,429 | 8/1945 | Bell et al. | 137—98 XR |
| 2,742,763 | 4/1956 | Cohen | 60—97 |
| 2,990,840 | 7/1961 | Snow | 137—98 |
| 3,208,223 | 9/1965 | Mamoru Watanabe. | |
| 3,208,223 | 9/1965 | Watanabe. | |

MARTIN P. SCHWADRON, *Primary Examiner.*

R. R. BUNEVICH, *Assistant Examiner.*

U.S. Cl. X.R.

91—171, 414; 137—98; 60—97